United States Patent [19]

Kenyoshi

[11] Patent Number: 5,469,493
[45] Date of Patent: Nov. 21, 1995

[54] TELEPHONE CALL SAVING SYSTEM AND METHOD FOR AN INTEGRATED SERVICE DIGITAL NETWORK

[75] Inventor: Kaoru Kenyoshi, Tokyo, Japan

[73] Assignee: NEC Corporation, Japan

[21] Appl. No.: 264,143

[22] Filed: Jun. 22, 1994

[30] Foreign Application Priority Data

Jun. 25, 1993 [JP] Japan .................................. 5-155472

[51] Int. Cl.⁶ .............................. H04M 1/24; H04M 3/00
[52] U.S. Cl. .............................. 379/9; 379/190; 379/191; 379/192; 379/193
[58] Field of Search ................................ 379/9, 190, 191, 379/192, 193, 208, 209, 218, 279

[56] References Cited

U.S. PATENT DOCUMENTS

| | | | |
|---|---|---|---|
| 2,676,209 | 4/1954 | Joel, Jr. | 379/192 |
| 3,821,718 | 6/1974 | Padgeti | 379/192 |
| 3,889,070 | 6/1975 | Oatis et al. | 379/192 |
| 4,847,893 | 7/1989 | Dang | 379/208 |
| 4,942,601 | 7/1990 | Park | 379/209 |
| 4,974,164 | 12/1990 | Ardon | 379/279 |
| 5,345,503 | 9/1994 | Lee | 379/279 |

FOREIGN PATENT DOCUMENTS 1-192246  8/1989  Japan .

Primary Examiner—Stephen Chin
Assistant Examiner—Vijay Shankar
Attorney, Agent, or Firm—Laff, Whitesel, Conte & Saret, Ltd.

[57] ABSTRACT

A call saving system for an ISDN telephone switching system includes a subscriber switching unit and terminal units connected to the subscriber switching unit via subscriber lines. A control device controls an overall call saving process executed between the subscriber switching unit and each terminal unit when a restart process is started after a call process is temporarily stopped. When a restart process is started, a restart message is transmitted to each terminal units on the basis of the presence/absence of a call to be saved. Each terminal unit includes a call state setting circuit for a state display message when information indicating a confirmation of a call saving is set in the restart message.

11 Claims, 5 Drawing Sheets

TELEPHONE CALL SAVING SYSTEM AND METHOD FOR AN INTEGRATED SERVICE DIGITAL NETWORK

BACKGROUND OF THE INVENTION

The present invention relates to interface between an ISDN (Integrated Service Digital Network) subscriber switching unit and user terminal units in a digital communication system using an ISDN and, more particularly, to a processing system for saving a call between the ISDN subscriber switching unit and a given terminal unit, which call was present before the subscriber switching unit temporarily stopped its process, without disconnecting the call when the subscriber switching unit restarts the process, and a method therefore.

When a general subscriber switching unit stops (interrupts) a process during an operation, all calls in processing are lost/canceled. In contrast to this, in an ISDN switching unit, if information about such a call is left at the execution of a restart process, and continuation of a connection process or the like for the call is required by the terminal unit side, the call can be saved without being lost/canceled. If such a call saving process is properly executed, an excellent system for reducing the large load exerted on the control unit of the switching unit in a restart process can be realized. In addition, this call saving process is an important service which can be offered to the users.

A conventional digital terminal unit associated with this process is disclosed in detail in Japanese Patent Laid-Open No. 1-192246.

A call saving determination process based on a conventional technique will be described below with reference to FIG. 5. In this case, when a restart process accompanying a call saving operation is started, a subscriber switching unit 1 determines a call state managed by the subscriber switching unit 1. That is, the subscriber switching unit 1 determines a call other than a call under communication or call set up processing and the state of a resource associated with the call managed by the subscriber switching unit 1. If it is determined that the call cannot be saved, the call is determined as a save disable call. In this case, the subscriber switching unit 1 transmits a release complete message 11 to a terminal unit 3 for each call so as to perform a call disconnection/release process.

If it is determined that the call state managed by the subscriber switching unit 1 indicates a call under communication or call set up processing, and the state of the resource associated with the call managed by the subscriber switching unit 1 indicates that the call can be saved, the target call is determined as a save enable call. In this case, the subscriber switching unit 1 transmits a state inquiry message 12 to the terminal unit 3 for each call, and starts a timer (not shown). Upon reception of the state inquiry message 12, the subscriber terminal unit 3 sets a call state managed by the terminal unit 3 in a state display message 13, and transmits it to the subscriber switching unit 1.

Upon reception of the state display message 13 from the terminal unit 3, the subscriber switching unit 1 determines a state display information element in the state display message 13, thus determining whether the set state indicates a call under communication or call set up processing, and the call state managed by the subscriber switching unit 1 coincides with the state set in the state display information element. In addition, the subscriber switching unit 1 determines the state of the resource associated with the call managed by the subscriber switching unit 1. If there is no contradiction in the state of the resource, and the call can be saved, the target call is determined as a save enable call.

If the call state set in the state display information element in the state inquiry message 12 indicates a call other than a call under communication or call set up processing, or if the call state set in the state display information element indicates a call under communication or call set up processing, but the call state managed by the subscriber switching unit 1 does not coincide with the call state on the terminal unit 3 side which is set in the state display information element in the state display message 13, the target call is determined as a save disable call. In this case, the subscriber switching unit 1 transmits a release complete message 14 to the terminal unit 3 to perform a call disconnection/release process.

Assume that the state set in the state display information element in the state display message 13 indicates a call under communication or call set up processing, and the call state managed by the subscriber switching unit 1 coincides with the state set in the state display information element. In this case, if there is contradiction in the state of the resource associated with the call managed by the subscriber switching unit 1, and a call saving process cannot be performed, the target call is determined as a save disable call. In this case, the subscriber switching unit 1 transmits the release complete message 14 to the terminal unit 3 to perform a call disconnection/release process.

When a predetermined period of time set in the timer (not shown) of the subscriber switching unit 1 has elapsed, the target call is determined as a save disable call. In this case, the subscriber switching unit 1 transmits the release complete message 14 to the terminal unit 3 to perform a call disconnection/release process.

In such a conventional call saving signaling system, the subscriber switching unit 1, which starts a restart process accompanying a call saving operation, determines the state of a resource and a call state managed on the subscriber switching unit 1 side. The subscriber switching unit 1 then transmits the state inquiry message 12 for each of all calls determined as calls which can be saved. In addition, the subscriber switching unit 1 transmits the release complete message 11 for each of all calls determined as calls which cannot be saved, thus performing a call disconnection/release process. For this reason, the number of messages to be transmitted at the start of a restart process becomes large. Consequently, the signal processing load on the subscriber switching unit 1 is increased, and it takes much time to perform a restart process.

SUMMARY OF THE INVENTION

It is an object of the present invention to provide a call saving system which can reduce the number of messages transmitted between a subscriber switching unit and each terminal unit in a restart process accompanying a call saving operation, and a method therefore.

It is another object of the present invention to provide a call saving system which can reduce the signal processing load associated with a restart process in a subscriber switching unit, and a method therefore.

In order to achieve the above objects, according to the present invention there is provided a call saving system comprising a subscriber switching unit, and a plurality of terminal units connected to the subscriber switching unit via subscriber lines, the subscriber switching unit including control means for controlling an overall call saving process executed between the subscriber switching unit and each of the terminal units when a restart process is started after a call process is temporarily stopped, restart means for setting information indicating confirmation of call saving in a restart message to be transmitted to each of the terminal units on the basis of the presence/absence of a call to be saved when a restart process is started, and transmitting the message to each terminal unit, and execution means for executing a call saving process with respect to a target call to be saved on the basis of a call state of the target call which is set in a state display message received from the subscriber switching unit, and each of the terminal units including state setting means for, when information indicating confirmation of call saving with respect to the terminal is set in the restart message from the subscriber switching unit, setting a call state of a target call in the state display message and transmitting the message to the subscriber switching unit.

DESCRIPTION OF THE PREFERRED EMBODIMENT

Figure 1:
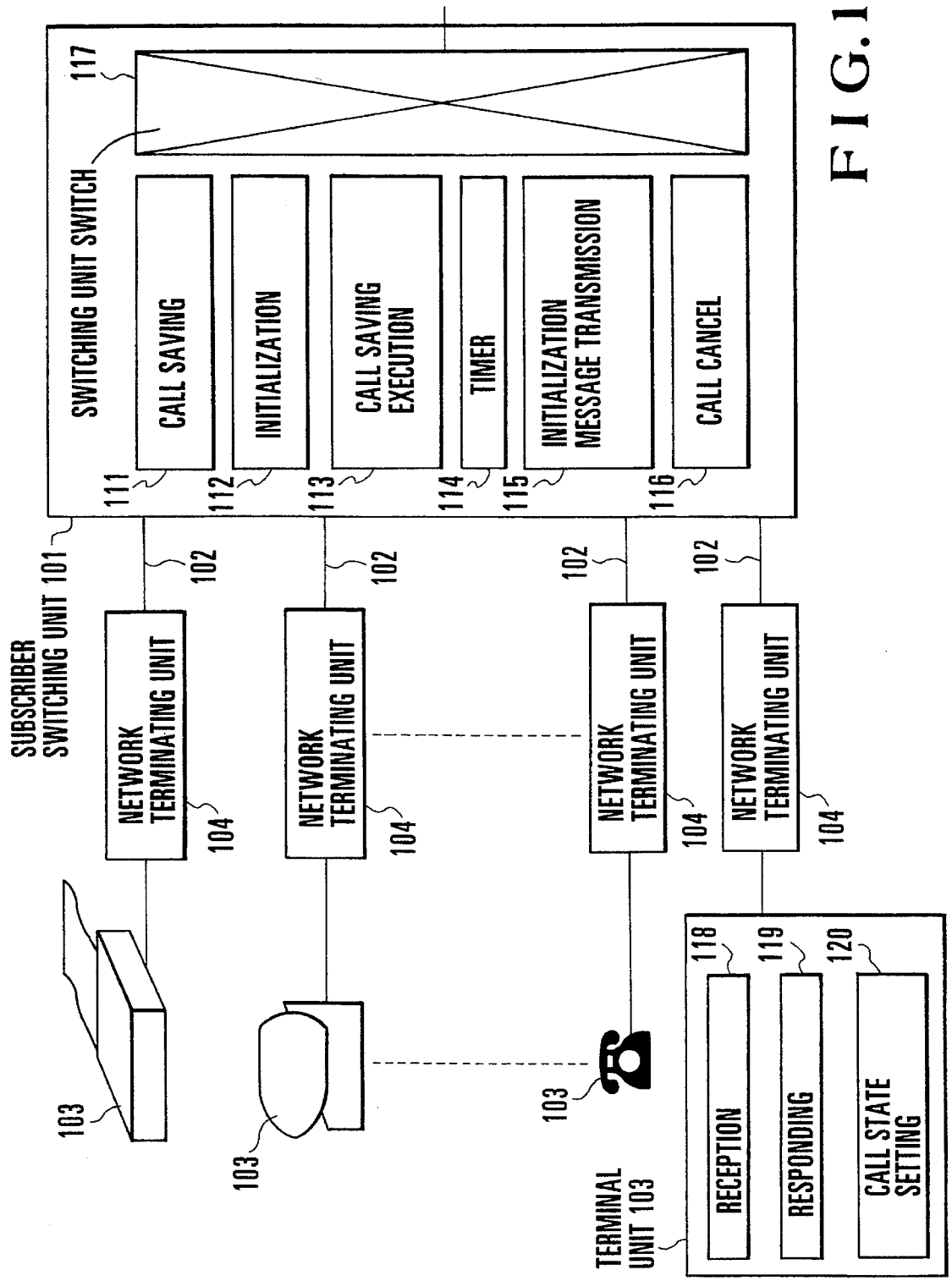
FIG. 1 is a block diagram showing the overall arrangement of a call saving system according to an embodiment of the present invention.

An embodiment of the present invention will be described below with reference to the accompanying drawings. FIG. 1 shows a call saving system according to the embodiment of the present invention.

This system includes a subscriber switching unit 101 and a large number of terminal units 103 connected to the subscriber switching unit 101 via subscriber lines 102 and network terminating units 104. The subscriber switching unit 101 includes a call saving means 111 for performing overall control of a call saving process executed between the subscriber switching unit 101 and a given terminal unit 103 when a restart process is started after call processing is temporarily stopped. As a characteristic feature of the present invention, the subscriber switching unit 101 includes a restart means 112 for setting information indicating confirmation of call saving in a restart message display factor to be transmitted to each terminal unit 103 depending on basis of the presence/absence of a call to be saved when a restart process is started. Each terminal unit 103 includes a plurality of means (to be described later) for transmitting a state display message in which the call state of a target call to be saved is set when information indicating confirmation of call saving with respect to the terminal unit 103 is detected in a restart message. The subscriber switching unit 101 includes a call saving execution means 113 for executing a call saving process with respect to a target call upon reception of a state display message.

In addition, the subscriber switching unit 101 includes a timer means 114, a restart message transmission means 115, and a call cancel means 116. The timer means 114 counts a predetermined period of time within which transmission of a restart message and reception of a state display message are executed. If it is determined in accordance with the time counting operation of the timer means 114 that the predetermined period of time has elapsed for the first time, the restart message transmission means 115 sets the timer means 114 again and transmits a restart message. When a state display message is received, and a call state set in the message does not coincide with a corresponding state on the subscriber switching unit 101 side, the call cancel means 116 cancels the call. In addition, if a resource exhibits incapability of saving, even though a call state set in a received restart display message coincides with a corresponding state on the subscriber switching unit 101 side, the call cancel means 116 cancels the corresponding call. Reference numeral 117 denotes a switching unit switch means.

As each terminal unit 103, a digital communication subscriber terminal unit including a reception means 118, a responding means 119, and a call state setting means 120 is used. The reception means 118 receives a restart message via the subscriber line 102. The responding means 119 transmits a state display message via the subscriber line 102 in response to the received restart message. When information indicating confirmation of call saving with respect to the terminal unit 103 is detected in the received restart message, the call state setting means 120 sets the call state of the target call (to be saved) in a state display message.

Figure 2:
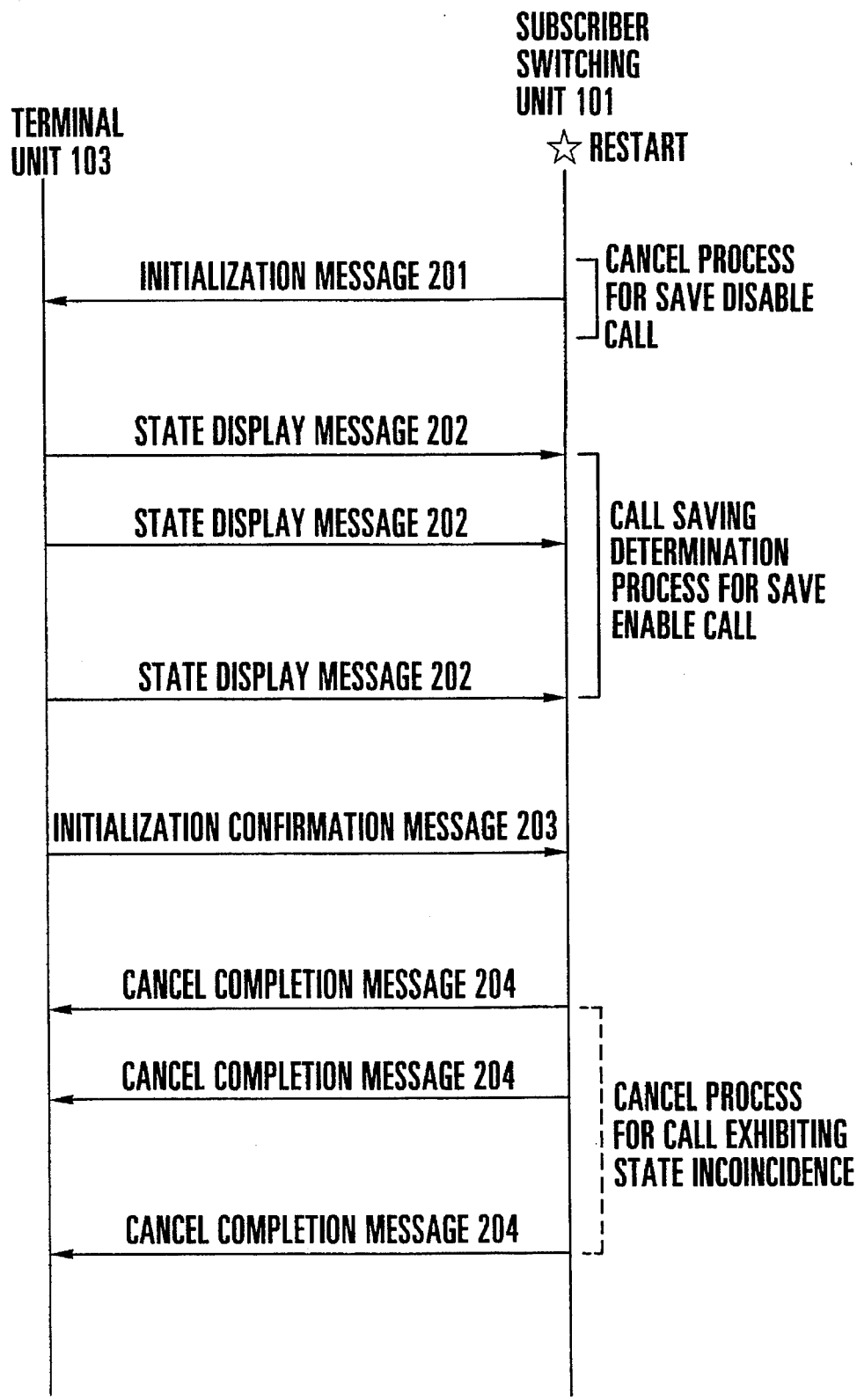
FIG. 2 is a view showing a signal sequence in the system shown in FIG. 1.
Figure 3:
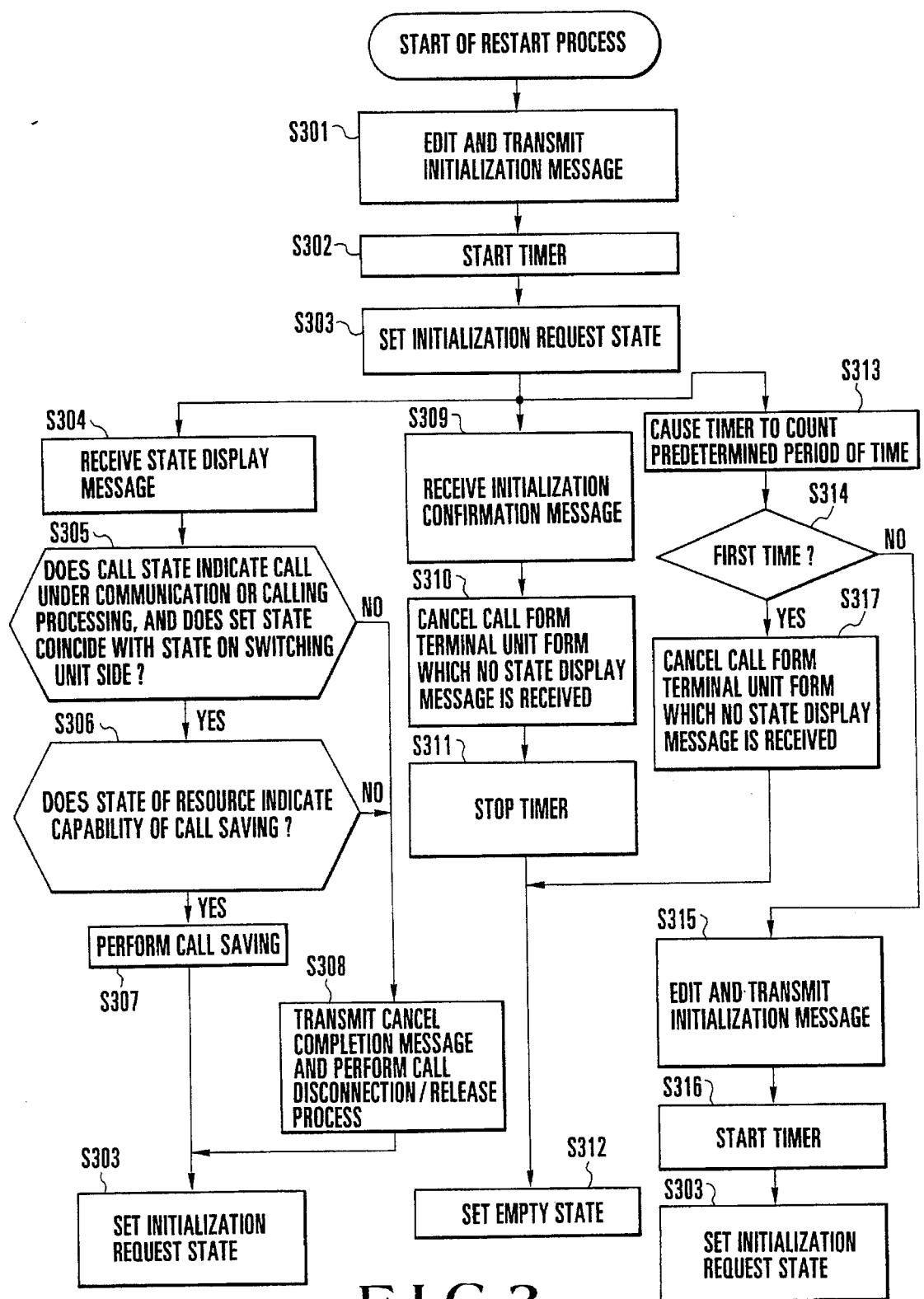
FIG. 3 is a flow chart showing the flow of a call saving determination process in a restart process accompanying a call saving operation in a switching unit.
Figure 4:
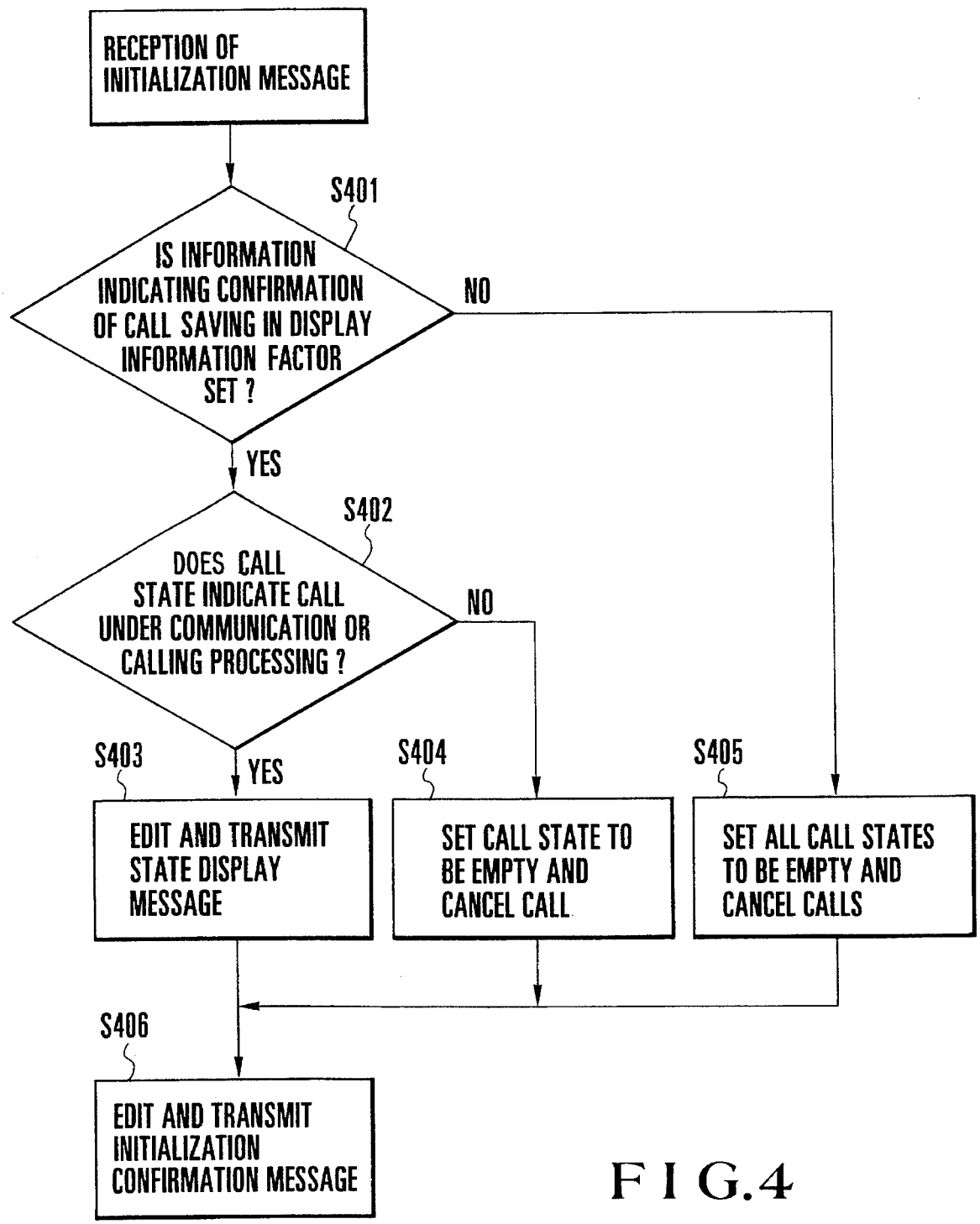
FIG. 4 is a flow chart showing the flow of a call saving process in a terminal unit shown in FIG. 1.

The operation of the embodiment of the present invention which has the above arrangement will be described next. FIG. 2 shows a signal sequence in the system shown in FIG. 1. FIG. 3 shows the flow of a call saving determination process in a restart process accompanying a call saving operation in the subscriber switching unit in the system shown in FIG. 1. FIG. 4 shows the flow of a call saving operation of a terminal unit in the system shown in FIG. 1.

As shown in FIG. 3, in the subscriber switching unit 101, when a restart process accompanying a call saving operation is started by the call saving means 111, the restart means 112 edits a restart message 201 common to calls, which message has information indicating confirmation of call saving set in a display information factor for each terminal unit 103, and transmits the message via each interface (step Sec). The timer means 114 is then started (step S302), and the flow advances to the next step "restart request state" (step S303).

The terminal unit 103 receives the restart message 201 from the subscriber switching unit 101 via the reception means 118. As shown in FIG. 4, the terminal unit 103 then determines a display information factor in the restart message 201 (step S401). If information indicating confirmation of call saving is set, the call state setting means 120 determines the state of a call managed on the terminal unit 103 side (step S402). If the call is determined as a call under communication or call set up processing, the call state setting means 120 sets/edits a call state in a state display message 202, and the responding means 119 transmits the message to the subscriber switching unit 101 (step S403). If it is determined in step S402 that the state of the call managed on the terminal unit 103 side indicates a call other than a call under communication or call set up processing, the call state is set to be "idle", thus canceling the call (step S404). If it is determined in step S401 that no information indicating confirmation of call saving is set in the display information factor in the restart message 201, the states of all calls managed by the terminal units 103 are set to be "idle" so as to cancel all the calls (step S405). When the above call saving process is completed with respect to all the calls managed by the terminal units 103, each terminal unit 103 edits a restart acknowledgment message 203 and transmits it to the subscriber switching unit 101 (step S406).

Referring to FIG. 3, if the subscriber switching unit 101 receives the state display message 202 from the terminal unit 103 in the "restart request state" set in step S303 (step S304), the call saving execution means 113 determines a state display information element in the state display message 202 (step S305). If the state set in the message indicates a call under communication or call set up processing, and the call state managed by the subscriber switching unit 101 coincides with the state set in the state display information element, the state of a resource associated with the call managed by the subscriber switching unit 101 is determined (step S306). If there is no contradiction in the state of the resource, and call saving can be performed, the target call is determined as a save enable call (step S307).

If it is determined in step S305 that the call state set in the state display information element in the state display message 202 indicates a call other than a call under communication or call set up processing, or indicate a call under communication or calling process but the call state managed by the subscriber switching unit 101 does not coincide with the call state on the terminal unit 103 side which is set in the state display information element in the state display message 202, the call cancel means 116 determines the target call as a save disable call, and transmits a release complete message 204 to the terminal unit 103, thus performing a call disconnection/release operation (step S308).

Assume that it is determined in step S305 that the state set in the state display information element in the state display message 202 indicates a call under communication or calling process, and the call state managed by the subscriber switching unit 101 coincides with the state set in the state display information element, and it is also determined in step 306 that there is a contradiction in the state of the resource associated with the call managed by the subscriber switching unit 101 and a call saving operation cannot be performed. In this case, the call cancel means 116 determines the target call as a save disable call, and transmits a release complete message to the terminal unit 103, thus performing a call disconnection/release operation (step S308). The flow advances from steps S307 and S308 to step S303 to wait for a state display message 202.

When the subscriber switching unit 101 receives a restart acknowledgment message from a terminal in the "restart request state" (step S309), all calls from the terminal units 103 from which no state display message 202 is received are determined as save disable call calls, and the call states managed by the subscriber switching unit 101 are set to be "idle", and the resources associated with the target calls are released (step S310). In addition, the timer means 114 is stopped (step S311), and the flow advances to the "idle" state (step S312).

Assume that a predetermined period of time set in the timer means 114 has elapsed while the subscriber switching unit 101 is in the "restart request state" in step S303 (step S313). If the time set in the timer means 114 has elapsed for the first time (step S314), the restart message transmission means 115 edits a restart acknowledgment message 203 in which information indicating confirmation of call saving is set in a display information factor, and transmits the restart acknowledgment message 203 gain to the corresponding interface (step S315). The timer means 114 is then started again (step S316). The flow advances from step S316 to step S303 to wait for a state display message 202. Assume that it is determined in step S314 that the time set in the timer means 114 has elapsed for the second time. In this case, all calls from the terminal units 103 from which no state display message 202 is received are determined as save disable call calls; the call states managed by the subscriber switching unit 101 are set to be the "idle" state; and the resources associated with the target calls are released (step S317). The flow then advances to the "idle" state in step S313.

Figure 5:
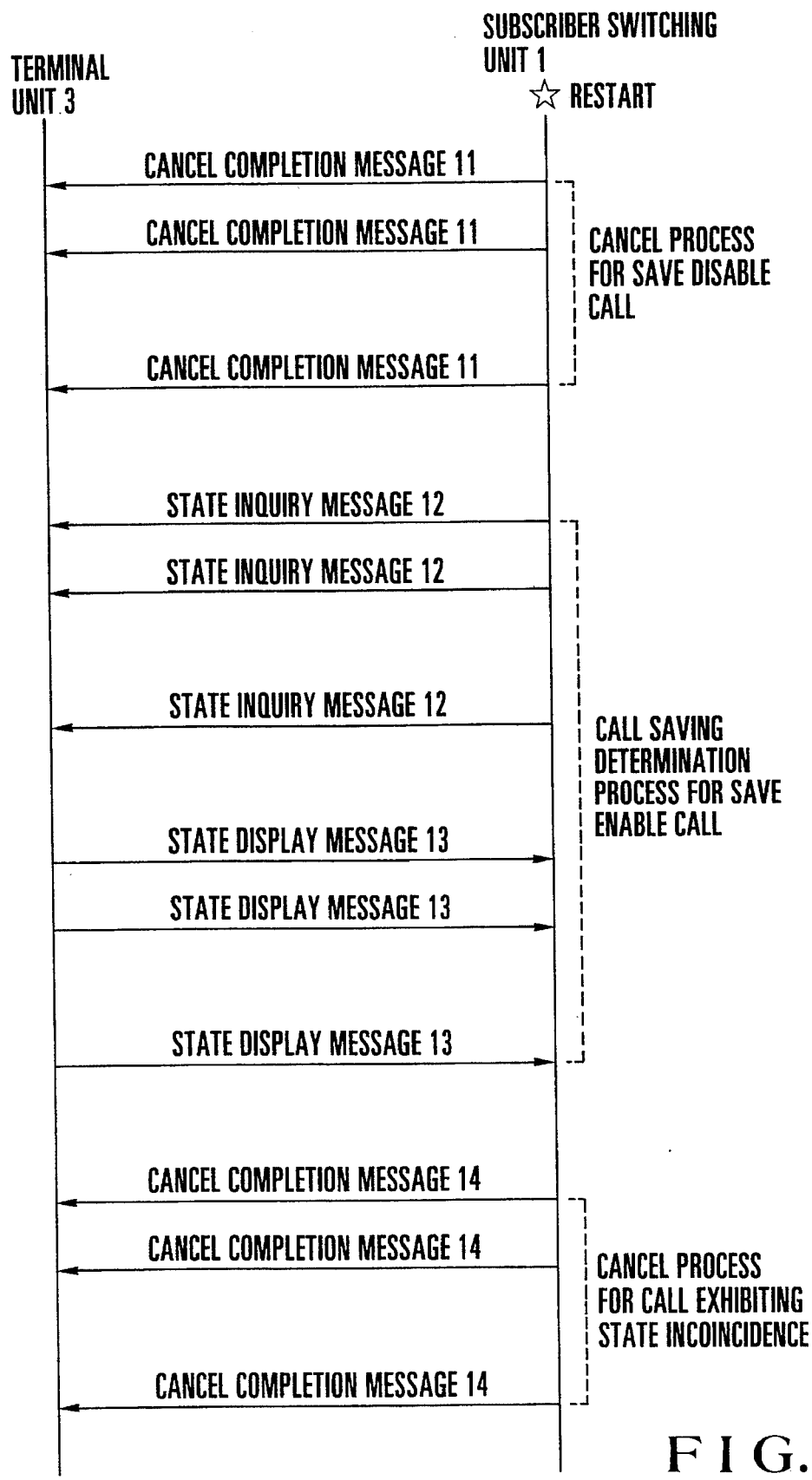
FIG. 5 is a view showing a signal sequence in a conventional system.

Referring to FIG. 5, assume that a restart process accompanying a call saving operation is started in the subscriber switching unit 1 accommodating 1,000 interfaces. Assume also that 10,000 calls are being processed; 80% of the calls are determined as save enable calls by the subscriber switching unit 1 or the terminal units 3 (the states of calls managed by the subscriber switching unit 1 or the terminal units 3 indicate calls under communication or call set up processing, and there is no contradiction in the resource state associated with each call managed by the subscriber switching unit 1); and 10% of the save enable calls exhibit incoincidence between the states of the corresponding calls managed by the subscriber switching unit 1 and the states of the corresponding calls managed by the terminal units 3, or there is a contradiction in the resource state associated with each call managed by the subscriber switching unit 1. In this case, in the conventional call saving signaling system, 2,000 release complete messages are transmitted from the subscriber switching unit 1 to the terminal units 3 to perform a cancel process for the save disable call calls; 8,000 state inquiry messages are transmitted from the subscriber switching unit 1 to the terminal units 3 to perform a saving determination process for the save enable calls; 8,000 state display messages are transmitted from the terminal units 3 to the subscriber switching unit 1; and 800 release complete messages are transmitted from the subscriber switching unit 1 to the terminal units 3 to perform a cancel process for the calls exhibiting state incoincidence. As described above, in the conventional call saving signaling system, in order to perform a call saving process, 10,800 messages are transmitted from the subscriber switching unit 1 to the terminal units 3, and 8,000 messages are transmitted from the terminal units 3 to the subscriber switching unit 1.

In the call saving signaling system of the present invention, 1,000 restart messages are transmitted from the subscriber switching unit 101 to the terminal units 103 to perform a cancel process for the save disable call calls; 8,000 state display messages are transmitted from the terminal units 103 to the subscriber switching unit 101 to perform a saving determination process for the save enable calls; 1,000 restart acknowledgment messages are transmitted from the terminal units 103 to the subscriber switching unit 101; and 800 release complete messages are transmitted from the subscriber switching unit 101 to the terminal units 103 to perform a cancel process for the calls exhibiting state incoincidence. As described above, in the call saving signaling system of the present invention, 1,800 messages are transmitted from the subscriber switching unit 101 to the terminal units 103 to perform a call saving process, and 9,000 messages are transmitted from the terminal units 103 to the subscriber switching unit 101. That is, the total number of messages transmitted between the subscriber switching unit 101 and the terminal units 103 is 10,800, which is smaller than the total number (18,800) of messages in the conventional system.

As has been described above, according to the present invention, in a restart process accompanying a call saving operation, the number of messages to be transmitted between the subscriber switching unit and the terminal units can be greatly reduced. Therefore, the signal process load associated with a restart process in the subscriber switching unit can be reduced.

What is claimed is:

1. A telephone call saving system for saving a call that is handled by a stopped call process, said telephone call saving system comprising:

a subscriber switching unit; and a plurality of terminal units connected to said subscriber switching unit via individually associated subscriber lines, said subscriber switching unit including:

call saving means for controlling an overall call saving process executed between said subscriber switching unit and each of said terminal units in response to a restart process which is started after a call process has been temporarily stopped, initialization means for setting information indicating a confirmation of a call saving in a restart message to be transmitted to each of said terminal units on a basis of a presence/absence of a call to be saved when a restart process is started, and for transmitting the message to each terminal unit, and execution means for executing a call saving process with respect to a target call to be saved on a basis of a call state of the target call which is set in a state display message received from said subscriber switching unit, and each of said terminal units including:

state setting means responsive to information indicating a confirmation of call saving with respect to each of said terminal units being set in the restart message from said subscriber switching unit for setting a call state of a target call in the state display message and for transmitting the message to said subscriber switching unit.

2. A system according to claim 1, wherein said subscriber switching unit comprises timer means for starting a time counting operation when the restart message is transmitted, and monitoring whether the state display message is received within a predetermined period of time, and said execution means executes a call saving process with respect to the state display message received within the predetermined period of time counted by said timer means.

3. A system according to claim 2, wherein said subscriber switching unit comprises re-transmission means for starting said timer means again when a time counting operation of said timer means is completed for the first time, and re-transmitting the restart message to said terminal unit.

4. A system according to claim 1, wherein said subscriber switching unit comprises call cancel means for, when the state message is received, canceling a target call exhibiting incoincidence between a set call state and a state on the subscriber switching unit side without performing a call saving process.

5. A system according to claim 1, wherein said subscriber switching unit comprises call cancel means for, when the state message is received, canceling a target call corresponding to a resource incapable of call saving without performing a call saving process regardless of whether a set state coincides with a state on the subscriber switching unit side.

6. A system according to claim 1, wherein said state setting means transmits a state display message, in which a call state indicating that a call is a target call is set, to said subscriber switching unit when a state of the call managed by said terminal unit indicates one of calls under communication and call set up processing.

7. A system according to claim 6, wherein said terminal unit cancels a call when a state of the call managed by said terminal unit indicates a call other than the calls under communication and call processing, and cancels all calls managed by said terminal unit when no information indicating confirmation of call saving in said terminal unit is set in the restart message.

8. A system according to claim 1, wherein said terminal unit transmits a restart acknowledgment message to said subscriber switching unit upon completion of a call saving process including transmission of the state display message, and said subscriber switching unit sets states of all calls from said terminal units from which the state information message is not received to idle states upon reception of the restart acknowledgment message, while releasing associated resources.

9. A digital communication subscriber terminal unit comprising:

reception means for receiving a restart message transmitted from a subscriber switching unit via a subscriber line when a restart process is started;

state setting means for, when information indicating confirmation of call saving with respect to said subscriber terminal unit is set in the received restart message, determining a corresponding call as a target call if a state of the call managed by said subscriber terminal unit is indicated one of calls under communication and call set up processing, and setting a call state of the target call in a state display message; and transmission means for transmitting the state display message, in which the call state is set, to said subscriber switching unit via the subscriber line.

10. A telephone call saving method comprising the steps of:

setting information indicating confirmation of call saving in a restart message to be transmitted to each terminal unit on the basis of the presence/absence of a call to be saved, and transmitting the message to a subscriber switching unit when a restart process is started after a call process is temporarily stopped;

checking whether information indicating confirmation of call saving with respect to each terminal unit in the received restart message is set;

setting and transmitting a call state of a target call in the state display message when the information indicating confirmation of call saving is set in the restart message; and executing a call saving process with respect to the target call on the basis of the set call state upon reception of the state display message in which the call state of the target call is set by said subscriber switching unit.

11. The method according to claim 10, further comprising the step of checking whether a state of a call managed by said terminal unit indicates one of calls under communication and call set up processing when information indicating confirmation of call saving is set in the restart message, and wherein the step of setting and transmitting the call state of the target call in the state display message includes the step of determining one of calls under communication and call set up processing as a target call, and setting a call state of the target call in the state display message.

* * * * *